United States Patent [19]

Ongaro

[11] 4,211,109
[45] Jul. 8, 1980

[54] MULTIPLE PLANE ROAD WHEEL FOR USE WITH TIRE MEASURING AND CORRECTING APPARATUS

[75] Inventor: Theodore Ongaro, Columbus, Ohio

[73] Assignee: Ongaro Dynamics, Ltd., Columbus, Ohio

[21] Appl. No.: 4,462

[22] Filed: Jan. 18, 1979

[51] Int. Cl.² .................................... G01M 17/02
[52] U.S. Cl. ......................................... 73/146
[58] Field of Search ............... 73/146, 117; 51/106 R, 51/DIG. 33, 165.91

[56] References Cited

U.S. PATENT DOCUMENTS

| | | | |
|---|---|---|---|
| 3,585,855 | 6/1971 | Albertson | 73/117 |
| 3,862,570 | 1/1975 | Ongaro | 73/146 |
| 4,016,020 | 4/1977 | Ongaro | 51/106 R |
| 4,078,339 | 3/1978 | Ongaro | 51/106 R |
| 4,084,350 | 3/1978 | Ongaro | 51/106 R |

*Primary Examiner*—Donald O. Woodiel
*Attorney, Agent, or Firm*—Frost & Jacobs

[57] ABSTRACT

A multiple plane road wheel for use in apparatus for correcting rubber tires wherein the periphery of the tire being corrected is in contact with and driven by the road wheel, the multiple plane road wheel comprising a series of uniform diameter wheel discs mounted for independent rotation about a common axis, each of the wheel discs being provided with sensor means positioned to sense forces generated by the rotating tire and transmitted to the wheel discs in the peripheral areas of the tire contacted by each wheel disc, thereby enabling the user to isolate and measure the forces generated by the tire throughout the full width of the tread.

9 Claims, 4 Drawing Figures

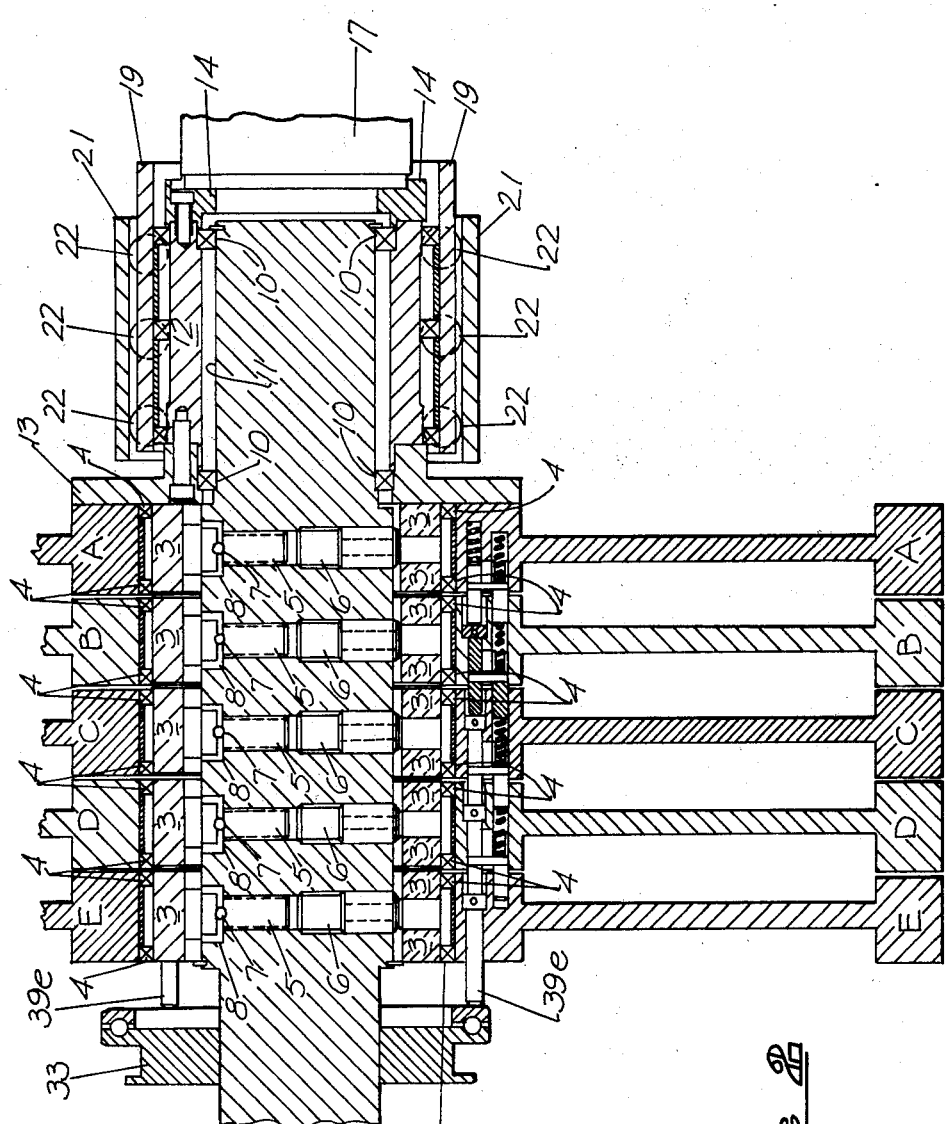

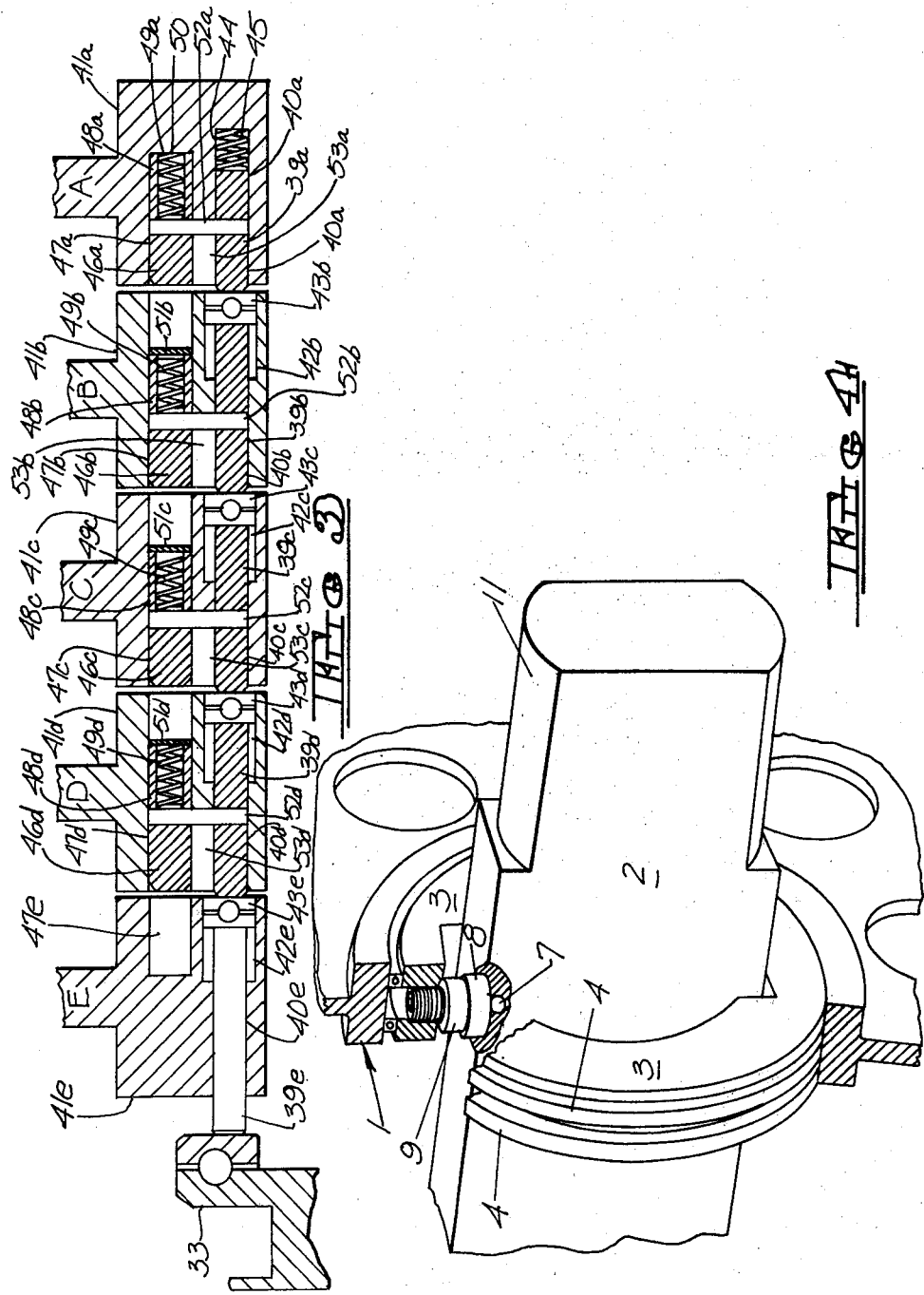

MULTIPLE PLANE ROAD WHEEL FOR USE WITH TIRE MEASURING AND CORRECTING APPARATUS

BRIEF SUMMARY OF THE INVENTION

This invention relates to apparatus for measuring and correcting vibrations generated in rubber tires under conditions simulating those encountered during normal operation, and relates specifically to the provision of a multiple plane road wheel for use with such apparatus, the multiple plane road wheel enabling the user to segregate, locate and measure forces generated by the tire being corrected which heretofore could not be individually measured.

While apparatus for measuring and correcting the vibration generating forces has taken numerous forms and is of varying degrees of complexity, the apparatus usually comprises a test wheel on which the tire is mounted, the periphery of the tire being contacted by a massive driven road wheel or a heavy flat belt which rotates the tire at the desired testing speed and also loads the tire to simulate the flattened area of the tire which is in contact with the road surface, known as the tire patch. Sensors have hitherto been associated with the spindle mounting the road wheel to measure and locate the centrifugally generated non-uniformities developed in the tire patch on opposite sides of the tire. While the measurements heretofore obtained have been highly useful in measuring and correcting the tire for peripheral non-uniformities, such measurements have been a composite of the forces generated across the width of the tire patch and it has not been possible to segregate and isolate these offending forces with respect to a given plane in which they occur. Since the accurate location and measurement of the offending forces is an essential prerequisite to their elimination, a principal object of the present invention is the provision of apparatus by means of which these forces may be accurately located and measured so that appropriate steps may be taken to eliminate them.

In particular, the present invention deals with the problem of rolling resistance, which is now recognized as a critical factor in unnecessary fuel consumption. The periphery of a tire is constructed to be essentially cylindrical; however, in its working environment, i.e., when in contact with the road surface, it is flat over the total tread width and tangential to the road surface in an area known as the tire patch, where the radius of the tire is always smaller than at any other angular location. In use, a complex hysteretic combination of vertical, fore-aft and lateral scrubbing reactions is developed in the area of the tire patch resulting in unpredictable, high rolling resistance. The present invention provides apparatus for isolating and measuring these contributing forces in a series of planes throughout the full width of the tire patch, whereupon appropriate corrective measures can be taken to reduce the rolling resistance to the lowest possible level.

In accordance with the invention, the road wheel consists of a series of closely spaced, narrow, lightweight wheel discs supported by anti-friction bearings mounted on a nonrotating supporting shaft. Each disc is provided with its own force sensor and is independently capable of sensing radial force variations which occur in the tire patch in the area contacted by the disc. The wheel discs are preferably made of aluminum or other lightweight alloy, and due to their light weight they are extremely sensitive and respond to forces which are incapable of detection utilizing conventional methods. The discs are arranged to be interconnected for joint operation, or they may be disengaged from each other for individual operation. In addition to the individual disc sensors, the nonrotating disc supporting shaft is also equipped with sensor means to provide composite axial force measurements. The disc assembly is adapted to be driven by drive means permanently connected to a single disc, referred to as the power disc, to which the other discs are operatively connected by an interlocking system which permits the discs to be driven in unison or, as previously indicated, they may be disengaged for independent rotation by the tire.

In addition to the individual force sensors, each of the discs is equipped with peripheral sensing means which senses peripheral behavior of the tire patch in the plane of each disc. When the discs are interconnected, the peripheral sensing elements on the discs are disposed in fixed relationship with respect to the peripheral sensor of the power disc. When the discs are released from the power disc, they are individually rotated by the tire patch, and any angular change in the peripheral signal of a disc, either advanced or retarded with respect to the peripheral signal generated by the power disc, is indicative of undesirable reactions occurring at the tire patch, namely, conicity phenomena and/or footprint misallignment (high hysteretic effects), each of which result in a scrubbing action and increased rolling resistance (accelerated tire wear), as well as steering pull and dog tracking. By being able to detect the location and magnitude of these forces in the plane of each disc, corrective action may be taken to hone the tire at the proper locations and in the proper amounts to remove or at least materially reduce the irregularities which produce the undesirable forces, the ultimate objective being to produce a tire having a constant loaded rolling radius, i.e., the tire in the area of the tire patch acting as a true cylinder. In accordance with the invention, this is accomplished with a minimum amount of machine time and tread rubber removal because, due to the extreme sensitivity of the individual discs, the undesirable forces are precisely measured in magnitude and at their precise angular locations, as well as in the peripheral plane across the total tire patch width in which they occur.

It will be understood that the signals generated by the sensing means associated with the discs will be fed to an electronic controller which correlates the information which is then utilized to activate a series of honing devices positioned to contact successive areas of the tire tread throughout its full width. Upon command signals from the electronic controller, the honers are activated to hone the irregular areas as sensed and measured at the tire patch. Reference is hereby made to the present inventor's U.S. Pat. No. 4,078,339, issued Mar. 14, 1978, entitled "Method For Correcting Rubber Tires For Forces Generated By Dynamic Non-Uniformities", and 4,084,350, issued Apr. 18, 1978, entitled "Correction Of Rubber Tires For Forces Generated By Non-Uniformities", which patents disclose tire correcting apparatus particularly suited for use with the present invention, including electronic control means and related components by means of which the signals generated by the measuring sensors are utilized to actuate honing devices positioned to selectively remove rubber from the periphery of the tire in accordance with the collected data. Reference is also made to the present inventor's earlier U.S. Pat. Nos. 3,862,570, issued Jan. 28, 1975, entitled "Tire Symmetry Measuring Method And System", and 4,016, 020, issued Apr. 5, 1977, entitled "System For Measuring And Correcting Vibrations Generated In Vehicular Tires", both of which also disclose systems and procedures for measuring and correcting tires for dynamic non-uniformities as well as lack of symmetry. It is to be understood that the purpose of the present invention is to add additional parameters to the force measurements obtained by the systems and procedures of the foregoing patents, the present invention providing accurate measurements of the forces which produce rolling resistance, such measurements when used in conjunction with those obtained in accordance with the aforementioned patents, providing comprehensive data for the correction of the complex and interrelated forces which contribute to undesirable tire performance.

BRIEF DESCRIPTION OF THE DRAWINGS

FIG. 2 is a vertical sectional view illustrating details of the raod wheel construction, including means for releasably interlocking the wheel discs.

FIG. 3 is an enlarged fragmentary vertical sectional view illustrating the wheel disc interlocking means in its alternate position of use.

FIG. 4 is an enlarged fragmentary perspective view with parts broken away illustrating the mounting ring and associated sensor for one of the wheel discs.

DETAILED DESCRIPTION

Figure 1:
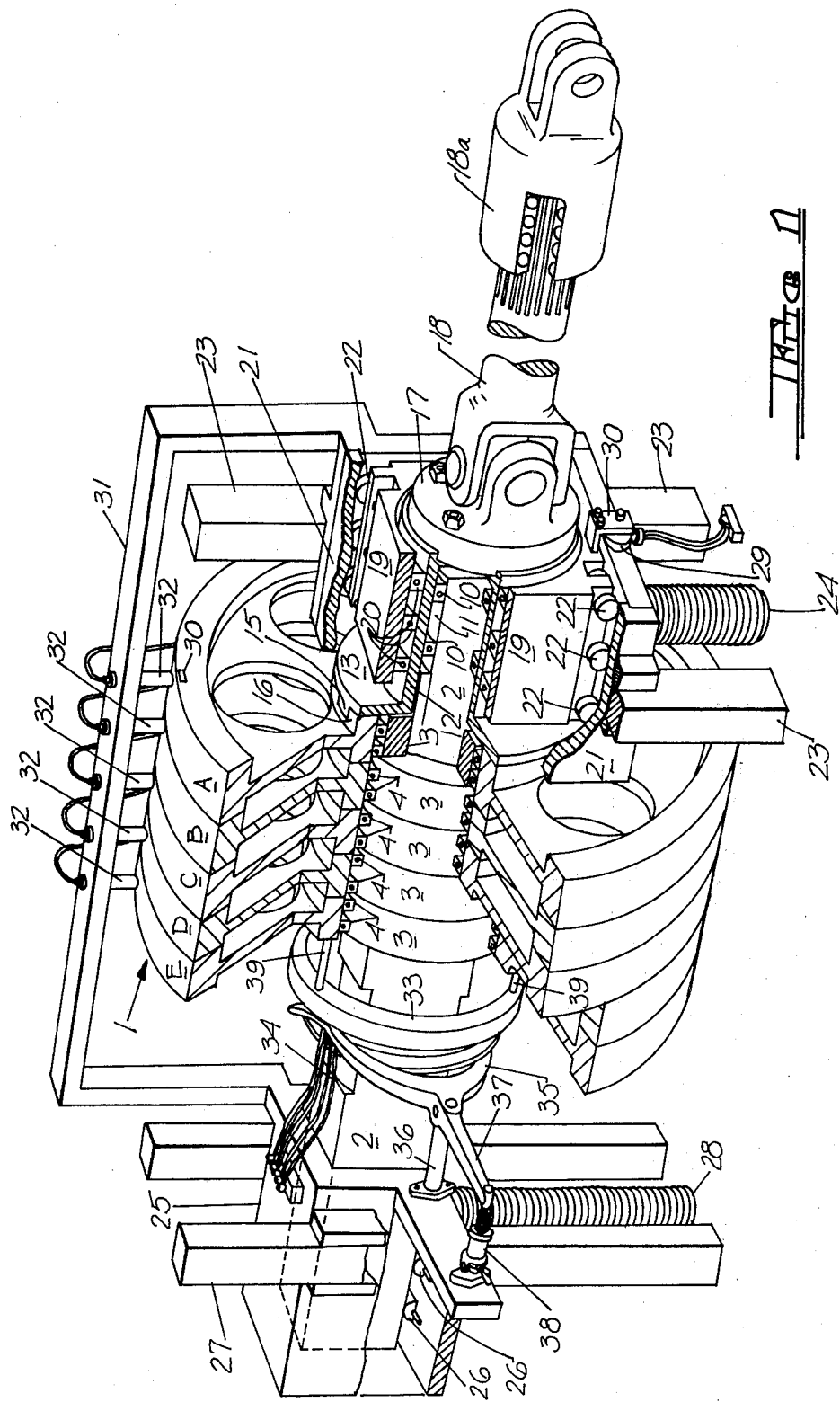
FIG. 1 is a perspective view with parts broken away of a multiple plane road wheel in accordance with the present invention, including exemplary supporting means for mounting the road wheel.

Referring first to FIG. 1 of the drawings, the road wheel, indicated generally at 1, is composed of a series of five wheel-like discs A, B, C, D and E. Each wheel disc is mounted on rectangular shaft 2 by means of an annular mounting ring 3 and sets of anti-friction bearings 4. As will be evident from FIG. 4, the annular rings 3 are configured so as to be free from contact with rectangular shaft 2, but they are nonetheless mounted on and uniformly centered relative to the shaft 2 by sets of adjusting screws 5 and 6, seen in FIG. 2, the screws 5 each supporting a spherical ball 7 which in turn supports a cup 8 which contacts a sensor 9 secured in the annular ring 3, the sensor 9 preferably being of the piezo electric crystal type. Each of the wheel discs A, B, C, D and E is mounted in identical manner, and each is provided with a sensor in the identical position. In the embodiment illustrated, the sensors 9 are mounted diametrically opposed to the portions of the wheel discs which will be contacted by the tire, the sensors thereby measuring force variations created by the rotating tire in the plane of each disc. As taught in the aforementioned patents, the signals generated by each of the sensors 9 will be correlated with respect to a reference point on the periphery of the tire so that both the magnitude and angular location of the non-uniformities will be precisely determined.

The nonrotating shaft 2 is supported at one end by annular bearings 10 which engage the rounded shoulder portions 11 of the shaft, the bearings supporting an annular coupling sleeve 12 having a driving disc 13 at one end and an annular flange 14 at its opposite end. The driving disc 13 has a key 15 by means of which it is coupled to the hub 16 of wheel disc A. The annular flange 15 mounts a coupling joint 17 adapted to be driven by means of a drive shaft 18 operatively connected to a source of power, such as an electric motor, which is not shown. With this arrangement, the coupling sleeve 12, including its driving disc 13, is rotatable relative to nonrotatable shaft 2 and is driven by coupling joint 17 and drive shaft 18.

The coupling sleeve 12 is rotatably journaled in a pillow block 19 by means of annular bearings 20. The pillow block 19 is, in turn, supported by a bearing block 21 which surrounds the pillow block, the pillow block being provided with sets of rollers 22 which mount the pillow block for movement relative to the bearing block 21, the pillow block being movable axially with respect to the longitudinal axis of shaft 2. With this arrangement, the coupling sleeve 12 is free to rotate relative to nonrotatable shaft 2 and pillow block 19, and at the same time the entire assembly comprising coupling sleeve 12, coupling joint 17 and drive shaft 18, together with the supporting pillow block 19 and the nonrotatable shaft 2 are axially displaceable as a unit along the longitudinal axis of nonrotatable shaft 2. The bearing block 21 is also slidably mounted on vertically disposed track members 23, the bearing block being movable lengthwise of the tracks by means of jackscrew 24, thereby permitting the entire assembly, including bearing block 21, to be moved in a direction transverse to the longitudinal axis of shaft 2.

At its opposite end, the shaft 2 is supported by a bearing block 25, the bearing block having rollers 26 which support the end of shaft 2 while permitting axial movement of the shaft relative to bearing block 25. The bearing block 25 is also mounted for movement relative to the track members 27, which parallel track members 23, by means of a jackscrew 28. The jackscrews 24 and 28 preferably will be interconnected for movement in unison, thereby permitting adjustment of the entire road wheel assembly toward and away from the periphery of the tire being processed. At the same time, the rollers 26, together with the previously described rollers 22, mount the shaft 2 for axial displacement under the influence of the wheel discs in a manner which will be described hereinafter.

Axial displacement of the shaft 2 occurs when the tire patch generates lateral forces which are transmitted through one or more of the wheel discs to the shaft. Actually, very little displacement of the shaft takes place, but nonetheless the forces which are generated will be detected by the compression-tension sensor 29 mounted on bracket 30 secured to pillow block 19, the sensor 29 being positioned to contact the adjacent side of bearing block 21. The sensor 29 will thus detect forces applied to shaft 9 tending to displace it axially in either direction, it being remembered that shaft 2, along with coupling sleeve 12 and pillow block 19 are mounted for joint movement relative to bearing block 21. Sensor 29 thus measures the magnitude and direction of the lateral force component generated by the tire patch. It will be understood the signals from sensor 29 will be fed to the electronic controller and correlated for use in honing the tire.

Since coupling joint 17 and drive shaft 18 are also operatively connected to coupling sleeve 12 and hence will move the coupling sleeve, the drive shaft 18 engages a linear anti-friction bearing member 18a which will rotate shaft 18 and yet permit axial movement of drive shaft 18 relative to bearing member 18a.

Each of the wheel discs is also provided with a magnet, one of which is indicated at 30 in FIG. 1, each magnet being mounted adjacent the periphery of the wheel discs. A bracket 31 overlies the wheel discs and mounts a series of sensing elements 32 each of which is positioned to overlie one of the wheel discs in cooperative relation with its magnet 30. The sensors 32 are responsive to the magnets 30 and individually provide a signal to the electronic controller to their angular positions in relation to driven disc A, which serves as a reference signal. Since the wheel is keyed to coupling sleeve 12 which is driven by shaft 18, disc A will rotate the tire at the desired speed. If all of the discs are coupled together for movement in unison, they will effectively form a full width unitary road wheel. However, if the wheel discs B, C, D and E are uncoupled so as to rotate independently of each other, each of the discs will be driven by the peripheral area of the tire which it contacts. If the tire patch acts as a true planar surface, i.e., the equivalent of a true cylinder, all of the discs, including driving disc A, will revolve in unison and the sensors 32 will provide a unified signal to the electronic controller. If, however, there are irregularities in the tire patch which either speed up or slow down the speed of rotation of one or more of the discs B, C, D and E relative to driven disc A, the corresponding sensors 32 will detect the deviations and appropriate signals will be relayed to the electronic controller, thereby indicating the magnitude of the deviations and the peripheral planes in which the deviations occur, thereby again providing measurements by means of which the periphery of the tire may be honed or eliminate or at least minimize the offending forces, so that the tire will have an essentially constant loaded radius in the area of the tire patch throughout its full width.

The number of wheel discs making up the road wheel does not constitute a limitation on the invention, the number utilized being dependent upon the width of the tread and the desired peripheral area of the tread to be scanned by each disc.

Means are provided to interconnect the discs for joint movement and to disconnect them for independent rotation relative to each other. To this end, the shaft 2 is provided with a thrust bearing assembly 33 which is axially displaceable along a portion of the shaft 2 adjacent wheel disc 3, the shaft having rounded shoulders 34 similar to the rounded shoulders 11 seen in FIG. 4 on which the thrust bearing assembly is slidably journaled. The thrust bearing assembly 33 is displaced axially by means of a yoke 35 pivotally mounted on a support arm 36, the yoke having a rearward extension 37 operatively connected to a solenoid or other servo mechanism 38 by means of which the yoke may be pivoted so as to displace the thrust bearing assembly 33 toward and away from the road wheel discs.

Thrust bearing assembly 33 is adapted to contact a set of actuating rods 39e each of which is disposed in a cooperating bore 40e in the hub of the endmost wheel disc E, as best seen in FIGS. 2 and 3, the actuating rods forming a part of the mechanism by means of which the wheel discs may be interconnected for joint movement and disengaged for independent movement. Preferably, there will be three interconnect systems located at spaced apart intervals about the hubs of the wheel discs, although preferably their spacing will be unequal so that the discs may be interconnected only when they are properly aligned relative to each other, usually with the magnets 30 in alignment so that, when the discs are interconnected, the magnets will generate a unified signal as they pass their respective sensors 32. Proper orientation of the wheel discs relative to each other can be readily obtained by positioning two of the rods 39e and their related components at angles of 120° from each other, with a third rod and its related components positioned 110° from one of the other rods and 130° from the remaining one.

As best seen in FIG. 3, which illustrates one of the interconnect systems in the release position, the actuating rod 39e is slidably journaled in a bore 40e in hub 41e of wheel disc E. The bore 40e communicates with an annular groove 42e in which an annular thrust bearing 43e is slidably mounted. In the position illustrated in FIG. 3, the thrust bearing assembly 33e has displaced the rod 39e inwardly so that the annular thrust bearing 43e lies adjacent the side edge of hub 41e facing the hub 41d of wheel disc D.

The hub 41d of wheel disc D is provided with an actuating rod 39d slidably mounted in bore 40d which communicates with an annular groove 42d in which an annular thrust bearing 43d is slidably journaled. The length of rod 39d is such that one end bears against the thrust bearing 43e of wheel disc E and at its opposite end bears against annular thrust bearing 43d which, in turn, bears against the adjacent rod 39c of wheel disc C, the rod 39c contacting an annular thrust bearing 43c slidably journaled in annular groove 42c. Hub 41b of wheel disc B is similarly provided with a rod 39b and an annular thrust bearing 43b slidably mounted in annular groove 42b. The hub 41a of wheel disc A is also provided with a rod 39a slidable in a bore 40a, with one end of the rod contacting the adjacent annular thrust bearing 43b. However, in this instance, the opposite end of the rod 39a is biased in the direction of annular thrust bearing 43b by means of spring 44 contained within the distal end 45 of bore 40a. Spring 44 is in a compressed condition when actuating rod 39a is in the position illustrated in FIG. 3. While each actuating rod bears against the annular thrust bearing of the next adjacent wheel disc, the wheel discs are nonetheless free to rotate relative to each other, the annular thrust bearing providing negligible resistance to the rotation of the wheel discs.

Wheel discs A, B, C and D are also provided with locking plungers, 46a, 46b, 46c, and 46d, respectively, slidably journaled in bores 47a, 47b, 47c, and 47d, respectively. The bore 47a extends inwardly from the side of hub 41a adjacent hub 41b but terminates short of the opposite side of hub 41a, whereas the bores 47b, 47c and 47d extend completely through their respective hubs. Additionally, the hub 41e of wheel disc E is provided with a bore 47e extending inwardly from the side adjoining wheel disc D but terminating short of its opposite side. Each of the locking plungers has a sleeve-like portion, indicated at 48a, 48b, 48c, and 48d in which compression springs 49a, 49b, 49c, and 49d are contained. Spring 49a bears at one end against locking plunger 46a and at its opposite end against the wall 50 of bore 47a. Springs 49b, 49c and 49d each bear at one end against their respective locking plungers and at their opposite end against retainers 51b, 51c and 51d fixedly secured in the bores 47b, 47c and 47d, respectively. The actuating rods and locking plungers are interconnected by rigid pins, indicated at 52a through 52d, the pins lying in slots 53a through 53d extending between and communicating with the bores in which the sets of rods and plungers are slidably journaled.

If it is desired to interlock the wheel discs A through E for movement in unison, the thrust bearing assembly 33 will be displaced away from wheel hub 41e, i.e., to the left as seen in FIG. 3, thereby freeing actuating rod 39e for axial movement under the influence of the next adjacent actuating rod 39d. However, since actuating rod 39d is connected through pin 52d to locking plunger 46d, the two elements must move in unison and this can occur only when locking plunger 46d is in axial alignment with the bore 47e in the adjacent wheel hub 41e. When the parts are properly aligned, the spring 49d will displace locking plunger 46d into bore 47e, and at the same time the actuating rod 39d will move into the annular groove 42e, thereby displacing annular thrust bearing 43e and actuating rod 39e in the direction of thrust bearing assembly 33 which was previously displaced away from hub 41e. Since there are three sets of interlocking mechanisms angularly located with respect to each other about the hub, all three sets of locking plungers 46d must be properly aligned with respect to their respective bores 47e in order for the annular thrust bearing 43e to be displaced. There is only one angular position in which this will occur, namely, when wheel discs D and E are oriented relative to each other with their magnets 30 in alignment. It will be further understood that wheel discs D and E will move out of alignment only if there are forces in the tire patch which cause the discs to move relative to each other. If such relative movement takes place it will continue until the two wheel discs have moved through one revolution relative to each other, at which point they will again be in proper alignment to be interconnected. Since tire correction in accordance with the present invention contemplates high speed correction, i.e., at the normal crusing speed contemplated for the tire, which may be 50 or more miles per hour, the wheel disc will be rotating at a rate of substantially ten or more revolutions per second, and consequently the desired alignment of the discs, even if misaligned during testing will occur quite rapidly.

It will also be evident that the interlocking mechanism will act sequentially; that is, until such time as actuating rod 39d is displaced axially, there can be no movement of the next adjacent actuating rod 39c since the latter actuating rod cannot displace annular thrust bearing 43d until actuating rod 39d has been displaced; and since locking plunger 46c cannot enter bore 47b until the parts are in axial alignment, wheel disc C cannot be interlocked with wheel disc D until the latter has been interlocked with disc E. Similar considerations apply to wheel discs B and A which also must be interlocked in sequence. When all of the wheel discs have interlocked, each of the interlocking mechanisms will assume the position illustrated in FIG. 2.

When it is desired to disengage the wheel disc for independent movement, the thrust bearing assembly 33 is shifted in the direction of the endmost wheel disc E, thereby displacing the actuating rods 39e in the opposite direction, which causes each of the actuating rods 39a through 39d to be displaced in like manner, together with the intervening annular thrust bearings 43b through 43e. By reason of the interconnection between the actuating rods and their locking plungers 46a through 46d, each of the wheel discs will be freed for independent rotation when the parts resume the position illustrated in FIG. 3.

It will be understood that while interconnection of the wheel discs for rotation in unison facilitates rotation of the tire during start up and braking after the desired operations have been performed, as well as the synchronizing of the signals generated by the sensors 32, the wheel discs may be operated independently of each other at all times since the speed of the rotation of the tire may be controlled solely by the power disc A and even though the magnets 30 of the several discs are out of their alignment at the time the measuring procedures are initiated, the sensors will nonetheless provide an indication of the initial angular location of each disc relative to the reference signal generated by power disc A, whereupon subsequent deviations of the discs from their initial angular locations will be indicated by the sensing elements 32.

While the disclosed road wheel assembly is capable of locating and measuring the various forces which contribute to rolling resistance, it will be evident that a multiple plane road wheel also may be utilized where less sophisticated measurements are desired. For example, if it is desired to isolate and measure across the width of the tire tread the forces which generate dynamic non-uniformities, a series of wheel discs equipped with piazo electric crystals 9 may be used for such purpose.

What is claimed is:

1. A multiple plane road wheel for use in apparatus for correcting rubber tires and the like wherein the periphery of the rotating tire being corrected is in contact with the road wheel throughout the width of the tire tread, said road wheel comprising a series of uniform diameter wheel discs, means mounting said wheel discs in side-by-side relation for independent rotation about a common axis of rotation, sensor means associated with each of said wheel discs, said sensor means being positioned to sense forces generated by the rotating tire and transmitted to the wheel discs in the peripheral areas of the tire contacted by each of said wheel discs.

2. The multiple plane road wheel claimed in claim 1 including drive means for rotating one of said wheel discs, whereby the tire is rotated by said driven wheel disc and the remaining wheel discs are driven by the tire.

3. The multiple plane road wheel claimed in claim 2 wherein the wheel disc mounting means comprise an elongated nonrotatable shaft defining the axis of rotation of said wheel discs and annular ring means mounting said wheel discs for rotation about said shaft, said sensor means including sensors interposed between said shaft and said annular ring means.

4. The multiple plane road wheel claimed in claim 3 wherein said last named sensors lie in a common plane which intersects the axis of rotation of the tire being corrected.

5. The multiple plane road wheel claimed in claim 4 wherein said wheel discs are fixed against axial displacement relative to said nonrotatable shaft, means mounting said shaft for axial displacement, and additional sensor means positioned to detect forces generated by said wheel discs which act to axially displace said shaft.

6. The multiple plane road wheel claimed in claim 5 including means mounting said shaft for movement toward and away from the tire being corrected in a direction normal to the longitudinal axis of said shaft 7. The multiple plane road wheel claimed in claim 7 including interlocking means for detachably interconnecting said wheel discs for movement in unison.

8. The multiple plane road wheel claimed in claim 1 wherein said sensing means include sensing elements associated with the periphery of each of said wheel discs, said last named sensing elements acting to detect variations in the speed of rotation of said wheel discs relative to each other.

9. The multiple plane road wheel claimed in claim 1 wherein said wheel discs are formed from a lightweight material, such as aluminum, whereby the individual wheel discs are responsive to force variations generated by the tire irrespective of their magnitude.

* * * * *